(12) United States Patent
Aoyama et al.

(10) Patent No.: US 7,364,613 B2
(45) Date of Patent: Apr. 29, 2008

(54) FLUORESCENT WATER BASE INK FOR INK-JET RECORDING

(75) Inventors: Michiko Aoyama, Nagoya (JP); Masashi Tsuda, Haguri-gun (JP); Hiromitsu Sago, Tokai (JP); Mayuko Umemura, Chiryu (JP); Hideto Yamazaki, Nagoya (JP); Shunichi Higashiyama, Yotsukaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 280 days.

(21) Appl. No.: 11/080,476

(22) Filed: Mar. 16, 2005

(65) Prior Publication Data
US 2005/0284331 A1    Dec. 29, 2005

(30) Foreign Application Priority Data
Mar. 19, 2004    (JP)    ............................. 2004-081324

(51) Int. Cl.
C09D 11/00    (2006.01)
C09D 11/02    (2006.01)

(52) U.S. Cl. ................................. 106/31.32; 106/31.15
(58) Field of Classification Search ............. 106/31.15, 106/31.32
See application file for complete search history.

(56) References Cited

U.S. PATENT DOCUMENTS 5,988,807 A * 11/1999 Bernard et al. ............. 347/100

6,284,027 B1    9/2001 Auslander et al.

FOREIGN PATENT DOCUMENTS

| JP | A 11-80632   | 3/1999 |
| JP | A 11-209675  | 8/1999 |
| JP | A 2003-192962 | 7/2003 |

* cited by examiner

Primary Examiner—J. A. Lorengo
Assistant Examiner—Veronica Faison-Gee
(74) Attorney, Agent, or Firm—Oliff & Berridge, PLC (57) ABSTRACT

A fluorescent water base ink for ink-jet recording includes water, a first fluorescent dye, and a second fluorescent dye. The first fluorescent dye absorbs light in a first absorption wavelength region in an ultraviolet region to emit fluorescence, and the first fluorescent dye absorbs light in a second absorption wavelength region to emit no fluorescence. The second fluorescent dye absorbs light in an absorption wavelength region in the ultraviolet region, which is different from the first absorption wavelength region of the first fluorescent dye, to emit fluorescence. A wavelength region of the fluorescence of the second fluorescent dye is not overlapped with the first absorption wavelength region of the first fluorescent dye, but at least a part of the wavelength region of the fluorescence of the second fluorescent dye is overlapped with the second absorption wavelength region. The fluorescence intensity of the ink is increased.

12 Claims, 8 Drawing Sheets

FLUORESCENT WATER BASE INK FOR INK-JET RECORDING

BACKGROUND OF THE INVENTION

1. Field of the Invention

The present invention relates to a fluorescent water base ink for ink-jet recording with which the ink-jet recording is to be performed.

2. Description of the Related Art

In the ink-jet recording system, the ink is discharged, for example, from the nozzles, the slits, or the porous film to perform the recording on the recording medium including, for example, the paper, the cloth, and the film. The system for discharging the ink adopted in the ink-jet recording system includes, for example, the electrostatic attraction system in which the ink is discharged by utilizing the electrostatic attracting force, the drop-on-demand system in which the mechanical vibration or the displacement is applied to the ink by using the piezoelectric element, and the thermal ink-jet system in which bubbles are generated by heating the ink to utilize the pressure generated thereby. Ink droplets are formed by using the ink discharge system as described above to adhere a part or all of the ink droplets onto the recording medium, and thus the recording is performed.

The development is advanced for the ink which is applicable in various fields as the ink to be used for the ink-jet recording system. The ink as described above includes, for example, such a fluorescent ink that any information, which requires the security, is recorded on a recording medium while the ink is allowed to posses the fluorescent property, and the information can be read by radiating the ultraviolet light onto the ink to emit the fluorescence.

The fluorescent ink includes not only transparent inks which have no absorption in the visible region but also color inks which have the absorption in the visible region. In the case of the color fluorescent ink which has the absorption in the visible region, the information can be recognized visually even with the naked eye. The reading means can be selected depending on the contents of the information. Therefore, it is expected to widen the versatility of the ink.

However, in general, it is known for the fluorescent ink that the concentration quenching phenomenon occurs such that the fluorescence intensity is all the more decreased if the concentration of the fluorescent dye contained in the ink exceeds a certain amount, for the following reason. That is, the fluorescent dye undergoes the transition from the excited state to the more stable state without radiating the absorbed energy as the light due to the interaction of the excited fluorescent dye molecules (nonradiating process). For this reason, various trials have been made in order to enhance the fluorescence intensity within a concentration range in which the concentration quenching phenomenon is not caused. A method, in which fluorescent dyes are used in combination, is an example thereof.

An ink described in Japanese Patent Application Laid-open No. 2003-192962 is exemplified as an example in which fluorescent dyes are combined in the fluorescent ink to use the ultraviolet light as the exciting light. In this example, two types of fluorescent dyes, i.e., a first fluorescent dye and a second fluorescent dye are used. The first fluorescent dye and the second fluorescent dye have a common absorption wavelength region in the ultraviolet region. Further, the first fluorescent dye and the second fluorescent dye have a common fluorescence wavelength region in the visible region. When the two types of the fluorescent dyes are combined, then the fluorescence intensity of the second fluorescent dye is added to the fluorescence intensity of the first fluorescent dye, and the ink having the high fluorescence intensity is obtained.

However, in the case of the ink described in Japanese Patent Application Laid-open No. 2003-192962, the first fluorescent dye and the second fluorescent dye absorb the ultraviolet light in the same wavelength region, because the first fluorescent dye and the second fluorescent dye have the common exciting wavelength region in the ultraviolet region. Therefore, a problem arises such that the excitation energy, which is possessed by the ultraviolet light, is shared by the two types of the fluorescent dyes, and it is impossible to effectively utilize the fluorescence possessed by each of the fluorescent dyes.

SUMMARY OF THE INVENTION

The present invention has been made in order to solve the problem involved in the conventional technique as described above, an object of which is to provide a fluorescent water base ink for ink-jet recording having a high fluorescence intensity.

According to the present invention, there is provided a fluorescent water base ink for ink-jet recording comprising water; a first fluorescent dye; and a second fluorescent dye; wherein the first fluorescent dye is a color fluorescent dye which absorbs light in a first absorption wavelength region in an ultraviolet region to emit fluorescence and which absorbs light in a second absorption wavelength region to emit no fluorescence; and the second fluorescent dye is a fluorescent dye which absorbs light in an absorption wavelength region in the ultraviolet region to emit fluorescence, the absorption wavelength region in the ultraviolet region being different from the first absorption wavelength region of the first fluorescent dye, a wavelength region of the fluorescence of the second fluorescent dye being not overlapped with the first absorption wavelength region of the first fluorescent dye, and at least a part of the wavelength region of the fluorescence of the second fluorescent dye being overlapped with the second absorption wavelength region.

The second fluorescent dye, which is used in the ink of the present invention, absorbs the light in the absorption wavelength region in the ultraviolet region which is different from the first absorption wavelength region of the first fluorescent dye to emit the fluorescence, when the second fluorescent dye is used singly, i.e., when the second fluorescent dye is not used together with the first fluorescent dye. The wavelength region of the fluorescence is not overlapped with the first absorption wavelength region of the first fluorescent dye, but at least a part of the wavelength region of the fluorescence is overlapped with the second absorption wavelength region. Therefore, in the case of the ink in which the second fluorescent dye as described above is combined with the first fluorescent dye, the second fluorescent dye absorbs the light, and it is excited. After that, the first fluorescent dye receives, from the second fluorescent dye, the energy which corresponds to the light absorption in the second absorption wavelength region. That is, the energy is transferred from the second fluorescent dye to the first fluorescent dye. As a result, it is considered that the fluorescence of the first fluorescent dye is increased. This fact is appreciated from the observation of the fluorescence spectrum as follows. The peak intensity in the fluorescence wavelength region of the first fluorescent dye, which is obtained when a fluorescence spectrum is measured for the fluorescent water base ink containing the first fluorescent dye at a predetermined concentration, is higher than the peak intensity in the fluorescence wavelength region of the first fluorescent dye which is obtained when a fluorescence spectrum is measured for a fluorescent water base ink not containing the second fluorescent dye and containing the first fluorescent dye at the predetermined concentration singly. Further, the peak intensity in the second fluorescence wavelength region, which is obtained when a fluorescence spectrum is measured for the fluorescent water base ink containing the second fluorescent dye at a predetermined concentration, is substantially zero or lower than a peak intensity in the second fluorescence wavelength region which is obtained when a fluorescence spectrum is measured for a fluorescent water base ink not containing the first fluorescent dye and containing the second fluorescent dye at the predetermined concentration singly.

DESCRIPTION OF THE PREFERRED EMBODIMENTS

The fluorescent water base ink for ink-jet recording of the present invention principally includes the first fluorescent dye, the second fluorescent dye, and water. The first fluorescent dye is the color fluorescent dye which absorbs, as the exciting light, the light at wavelengths in the ultraviolet region (hereinafter appropriately referred to as "first absorption wavelength region") and which emits the fluorescence in the visible light region. The first fluorescent dye has the following spectroscopic characteristics. That is, the first fluorescent dye absorbs the light in the wavelength region (hereinafter appropriately referred to as "second absorption wavelength region") which is different from the light in the first absorption wavelength region, but no fluorescence is emitted by the light. That is, the "first absorption wavelength region" of the first fluorescent dye means the absorption wavelength region in which the first fluorescent dye emits the fluorescence when the first fluorescent dye absorbs the light at the wavelength included therein. The "second absorption wavelength region" of the first fluorescent dye means the absorption wavelength region in which no fluorescence is emitted even when the first fluorescent dye absorbs the light at the wavelength included therein.

The second fluorescent dye absorbs, as the exciting light, the light in the ultraviolet region different from that of the first fluorescent dye, and the second fluorescent dye emits the fluorescence in the wavelength region different from the first absorption wavelength region of the first fluorescent dye, when the second fluorescent dye is used singly, i.e., when the second fluorescent dye is not used together with the first fluorescent dye. At least a part of the wavelength region of the fluorescence of the second fluorescent dye is overlapped with the second absorption wavelength region of the first fluorescent dye. In this application document, the ultraviolet region is a wavelength region of 200 to 380 nm. The first fluorescent dye and the second fluorescent dye have the absorption wavelength regions included in this wavelength region. In this application document, the phrase "wavelength region of the light absorbed by the second fluorescent dye is different from the first absorption wavelength region of the first fluorescent dye" means that the peak wavelength in the first absorption wavelength region of the first fluorescent dye and the peak wavelength in the absorption wavelength region of the second fluorescent dye are separated from each other by not less than 10 nm.

The first fluorescent dye includes, for example, C.I. Basic Red 1, 2, 9, 12, 13, 14, and 17, and C.I. Basic Violet 1, 3, 7, 10, 11:1, and 14. For example, C.I. Basic Red 1 absorbs the light at 250 to 270 nm and 450 to 560 nm, and it emits the fluorescence at 580 to 600 nm. In this case, it is considered that the absorption wavelength region of 450 to 560 nm (second absorption wavelength region) does not contribute to the emission of the fluorescence of 580 to 600 nm. C.I. Basic Violet 11:1 absorbs the light at 210 to 280 nm and 480 to 590 nm, and it emits the fluorescence at 600 to 630 nm. In this case, it is considered that the absorption wavelength region of 480 to 590 nm (second absorption wavelength region) does not contribute to the emission of the fluorescence of 600 to 630 nm.

It is preferable that a content of the first fluorescent dye is 0.1 to 2.0% by weight with respect to a total weight of the fluorescent water base ink for ink-jet recording of the present invention. If the content is less than 0.1% by weight, any sufficient fluorescence is not emitted. If the content exceeds 2.0% by weight, then the quenching phenomenon occurs, and the fluorescence intensity is lowered. More preferably, the content is 0.3 to 1.0% by weight.

The second fluorescent dye includes, for example, C.I. Basic Yellow 9, 11, 21, 35, 37, 40, 44, and 95. For example, C.I. Basic Yellow 37 absorbs the light at 280 to 330 nm and 390 to 440 nm, and it emits the fluorescence at 450 to 520 nm. C.I. Basic Yellow 40 absorbs the light at 230 to 320 nm and 390 to 480 nm, and it emits the fluorescence at 470 to 550 nm.

It is preferable that a content of the second fluorescent dye is 0.1 to 5.0% by weight with respect to a total weight of the fluorescent water base ink for ink-jet recording of the present invention. If the content is less than 0.1% by weight, any sufficient fluorescence is not emitted. If the content exceeds 5.0% by weight, then the solid content is increased in the ink, and the stability of the ink is harmfully affected thereby. More preferably, the content is 0.3 to 3.0% by weight. In view of such a function that the presence of the second fluorescent dye amplifies the fluorescence of the first fluorescent dye as described later on, it is desirable that the second fluorescent dye has a molar ratio of 1.0 to 3.0 with respect to the first fluorescent dye.

The combination of the first fluorescent dye and the second fluorescent dye is not specifically limited, and the dyes as exemplified above can be appropriately combined. In particular, it is preferable to adopt such combinations that the first fluorescent dye is C.I. Basic Violet 11:1, and the second fluorescent dye is C.I. Basic Yellow 37 or C.I. Basic Yellow 40.

In the case of the ink prepared by mixing the first fluorescent dye and the second fluorescent dye, the light in the fluorescence wavelength region originally possessed by the second fluorescent dye is not emitted, and the light emission energy of the second fluorescent dye is used for another way of use. The light emission energy of the second fluorescent dye is transferred to the first fluorescent dye. The fluorescence wavelength region of the second fluorescent dye is overlapped with the second absorption wavelength region of the first fluorescent dye. Further, the first absorption wavelength region of the first fluorescent dye is not overlapped with the fluorescence wavelength region of the second fluorescent dye. Therefore, the process, in which the second fluorescent dye loses the energy when the second fluorescent dye is returned from the excited state to the normal state, is not the radiation transition process (fluorescence emission) but the radiationless transition process. The energy is transferred without any radiation from the second fluorescent dye to the first fluorescent dye which has the second absorption wavelength in the wavelength region overlapped with the fluorescence wavelength region of the second fluorescent dye, in place of the emission of the fluorescence by the second fluorescent dye. Therefore, the first fluorescent dye can further emit the fluorescence, and it is possible to enhance the fluorescence intensity of the ink.

As for the water to be used in the present invention, it is preferable to use waters having high purities such as ion exchange water and distilled water, rather than ordinary water such as tap water. The content of water in the ink of the present invention may be appropriately determined depending on the first fluorescent dye, the second fluorescent dye, the composition thereof, and the desired characteristics of the ink. However, the content of water is preferably 10.0 to 95.0% by weight and more preferably 30.0 to 90.0% by weight with respect to the total weight of the fluorescent water base ink for ink-jet recording of the present invention.

The fluorescent water base ink for ink-jet recording of the present invention is basically constructed as described above. However, if necessary, it is possible to add other known various moistening agents, permeating agents, surfactants, viscosity-adjusting agents, surface tension-adjusting agents, pH-adjusting agents, and antiseptic/fungicidal agents. When the fluorescent water base ink for ink-jet recording of the present invention is applied to the ink-jet system in which the ink is jetted in accordance with the action of the thermal energy, it is also allowable to appropriately adjust thermal physical property values such as the specific heat, the coefficient of thermal expansion, and the coefficient of thermal conductivity of the ink by using any additive.

The present invention will be explained in further detail below as exemplified by Examples. However, the present invention is not limited to Examples.

EXAMPLES 1 TO 4

A first fluorescent dye was agitated together with a second fluorescent dye which had a first absorption wavelength region different from an absorption wavelength region of the first fluorescent dye and which had a fluorescence wavelength in a second absorption wavelength region of the first fluorescent dye in accordance with each of compositions shown in Table 1. After that, the filtration was performed with a membrane filter of 0.8 μm to prepare inks of Examples 1 to 4, respectively, in each of which the fluorescence intensity was enhanced. The compositions in Table 1 are expressed by the % by weight.

TABLE 1

|  |  | First absorption wavelength (nm) | Second absorption wavelength (nm) | Fluorescent wavelength (nm) | Ex. 1 | Ex. 2 | Ex. 3 | Ex. 4 |
|---|---|---|---|---|---|---|---|---|
| First fluorescent dye | Basic Red 1 | 250-270 | 450-560 | 580-600 | 0.5 | 0.5 | — | — |
|  | Basic Violet 11:1 | 210-280 | 480-590 | 600-630 | — | — | 0.3 | 0.3 |
| Second fluorescent dye | Basic Yellow 37 | 280-330 | 390-440 | 450-520 | 0.3 | — | 0.3 | — |
|  | Basic Yellow 40 | 230-320 | 390-480 | 470-550 | — | 0.4 | — | 0.4 |
| Moistening agent | glycelol |  |  |  | 25.0 | 25.0 | 25.0 | 25.0 |
| Permeating agent | butyltriglycol |  |  |  | 5.0 | 5.0 | 5.0 | 5.0 |
| Balance | pure water |  |  |  | balance | balance | balance | balance |

COMPARATIVE EXAMPLES 1 TO 6

Inks of Comparative Examples 1 to 6 were prepared in accordance with compositions shown in Table 2. An ink, which contained only a first fluorescent dye, was prepared in each of Comparative Examples 1 and 2. An ink using a second fluorescent dye having no fluorescence wavelength in a second absorption wavelength region of the first fluorescent dye, was prepared in each of Comparative Examples 3 to 6. The inks were prepared in the same manner as in Examples 1 to 4. The compositions shown in the table are expressed by the % by weight.

TABLE 2

|  |  | First absorption wavelength (nm) | Second absorption wavelength (nm) | Fluorescent wavelength (nm) | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|
| First fluorescent dye | Basic Red 1 | 250-270 | 450-560 | 580-600 | 0.5 | — | 0.5 | 0.5 | — | — |
|  | Basic Violet 11:1 | 210-280 | 480-590 | 600-630 | — | 0.3 | — | — | 0.3 | 0.3 |
| Second fluorescent dye | Basic Green 1 | 220-240 | 320-410 | 420-450 | — | — | 0.4 | — | 0.4 | — |
|  | Basic Blue 3 | 200-220 | 280-390 | 400-430 | — | — | — | 0.3 | — | 0.3 |
| Moistening agent | glycelol |  |  |  | 25.0 | 25.0 | 25.0 | 25.0 | 25.0 | 25.0 |
| Permeating agent | butyltriglycol |  |  |  | 5.0 | 5.0 | 5.0 | 5.0 | 5.0 | 5.0 |
| Balance | pure water |  |  |  | balance | balance | balance | balance | balance | balance |

Measurement of Absorption Spectrum

Figure 1:
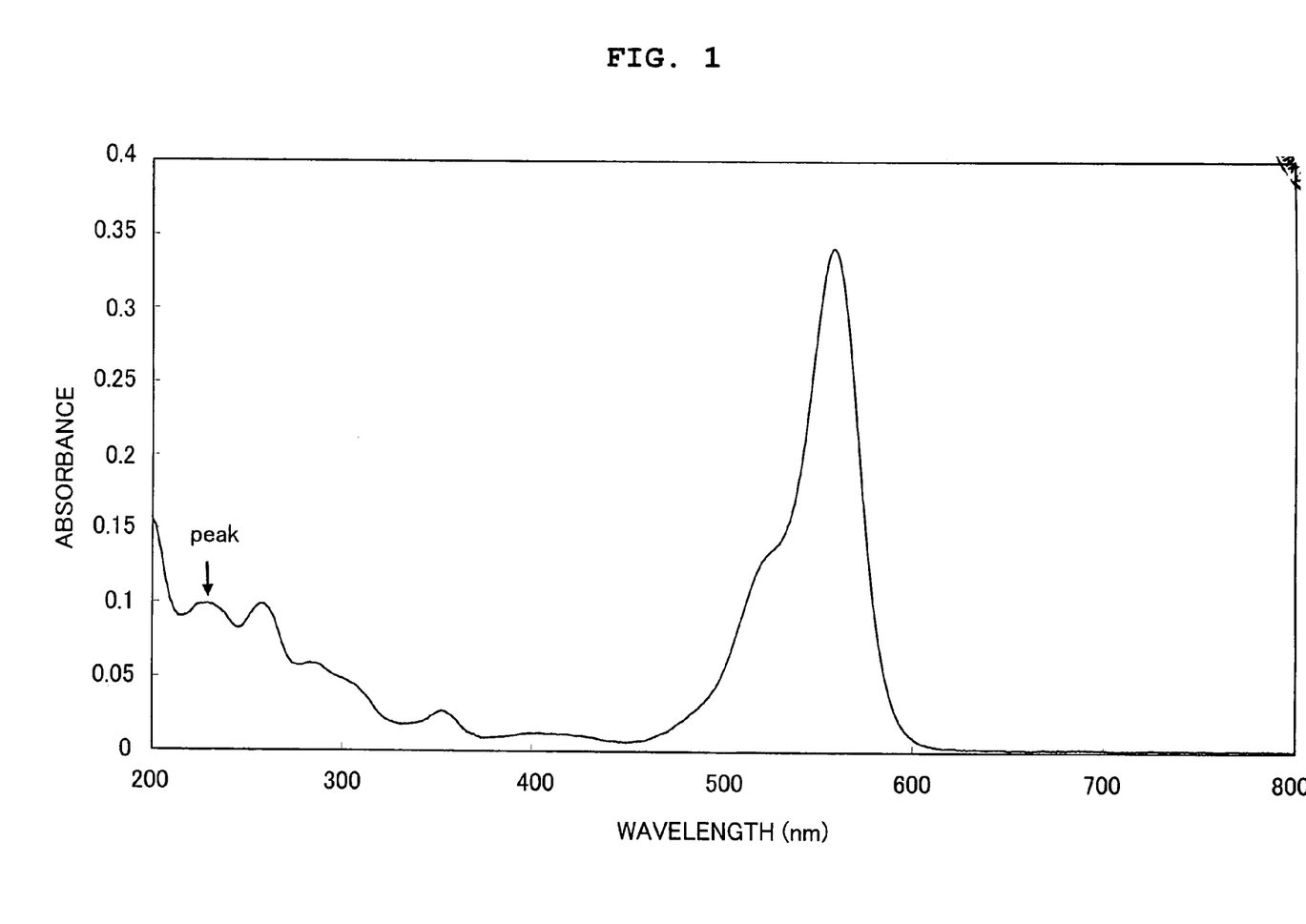
FIG. 1 shows an absorption spectrum in the ultraviolet-visible region of C.I. Basic Violet 11:1.
Figure 2:
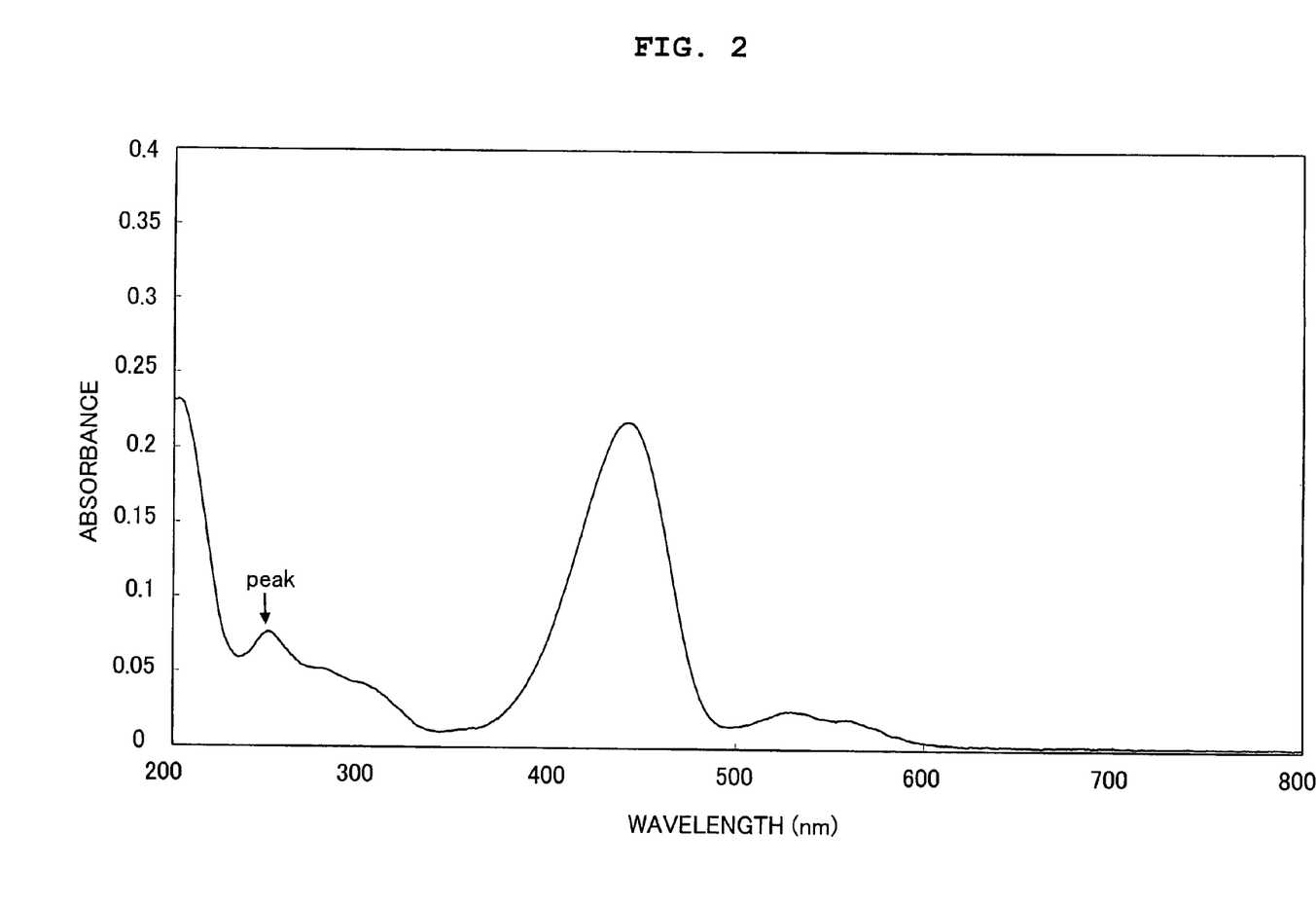
FIG. 2 shows an absorption spectrum in the ultraviolet-visible region of C.I. Basic Yellow 40.

The absorption spectrum of each of the fluorescent dyes added upon the preparation of the inks of Examples 1 to 4 and Comparative Examples 1 to 6 was measured by using an ultraviolet-visible spectrophotometer (UV-3100PC produced by Shimadzu Corporation). Examples of the absorption spectrum are shown in the drawings. FIG. 1 shows an absorption spectrum in the ultraviolet-visible region of C.I. Basic Violet 11:1 used in the inks of Examples 3 and 4. FIG. 2 shows an absorption spectrum in the ultraviolet-visible region of C.I. Basic Yellow 40 used in the inks of Examples 2 and 4. As appreciated from the ultraviolet absorption spectrum of C.I. Basic Violet 11:1 shown in FIG. 1, the wavelength (in the vicinity of 230 nm shown by the arrow in the drawing), at which the absorption is locally maximized in the ultraviolet region, is the ultraviolet absorption peak wavelength of C.I. Basic Violet 11:1. As appreciated from the ultraviolet absorption spectrum of C.I. Basic Yellow 40 shown in FIG. 2, the wavelength (in the vicinity of 250 nm shown by the arrow in the drawing), at which the absorption is locally maximized in the ultraviolet region, is the ultraviolet absorption peak wavelength of C.I. Basic Yellow 40. When a plurality of wavelengths, at which the absorption is locally maximized, are present in the ultraviolet region (200 nm to 380 nm), the peak wavelength is a wavelength at which the absorbance is the largest, of the plurality of wavelengths at which the absorption is locally maximized. According to the spectrums, it is understood that the ultraviolet absorption peak position of C.I. Basic Violet 11:1 is separated from that of C.I. Basic Yellow 40 by not less than 10 nm, especially by not less than 15 nm. Further, it is appreciated that C.I. Basic Violet 11:1 has the absorption region in a range of 480 nm to 590 nm in the visible region, and C.I. Basic Yellow 40 has the absorption region in a range of 390 nm to 480 nm in the visible region. The first and second absorption wavelengths and the peak positions were also determined from the absorption spectrums for the other fluorescent dyes used in Examples 1 to 4 and Comparative Examples 1 to 6.

Measurement of Fluorescence Spectrum

The printing was performed on the regular paper (XE-ROX 4200 produced by Fuji Xerox) by using an ink-jet printer (MFC-5200J produced by Brother Industries, Ltd.) with the inks prepared in Examples 1 to 4 and Comparative Examples 1 to 6. A portion, on which the covering ratio was 100%, was used as a recording sample. The fluorescence spectrum was observed by using a fluorescence spectrophotometer (F-4500 produced by Hitachi) to obtain the fluorescence intensity of the recording sample. When the fluorescence spectrum was measured, then the fluorescence intensity was measured between fluorescence wavelengths of 200 and 650 nm while changing the wavelength of the exciting light source between 200 and 500 nm, and thus a three-dimensional fluorescence spectrum was obtained.

Figure 3:
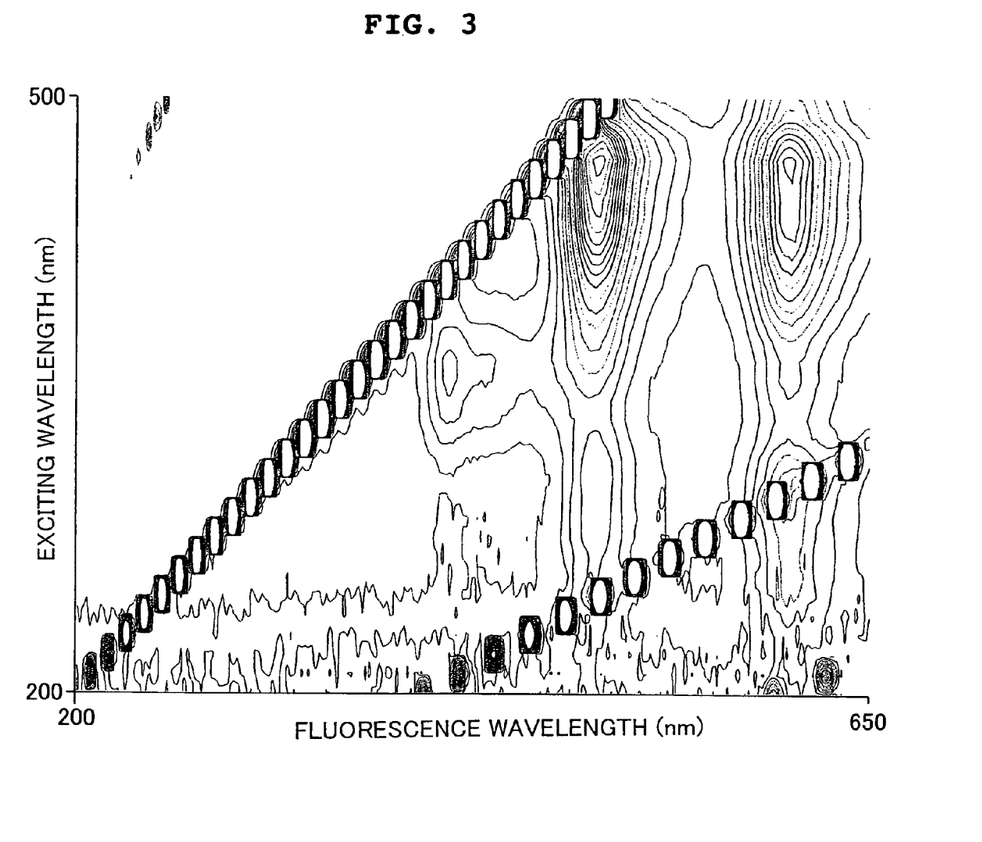
FIG. 3 shows a three-dimensional fluorescence spectrum of an ink of Example 4.
Figure 4:
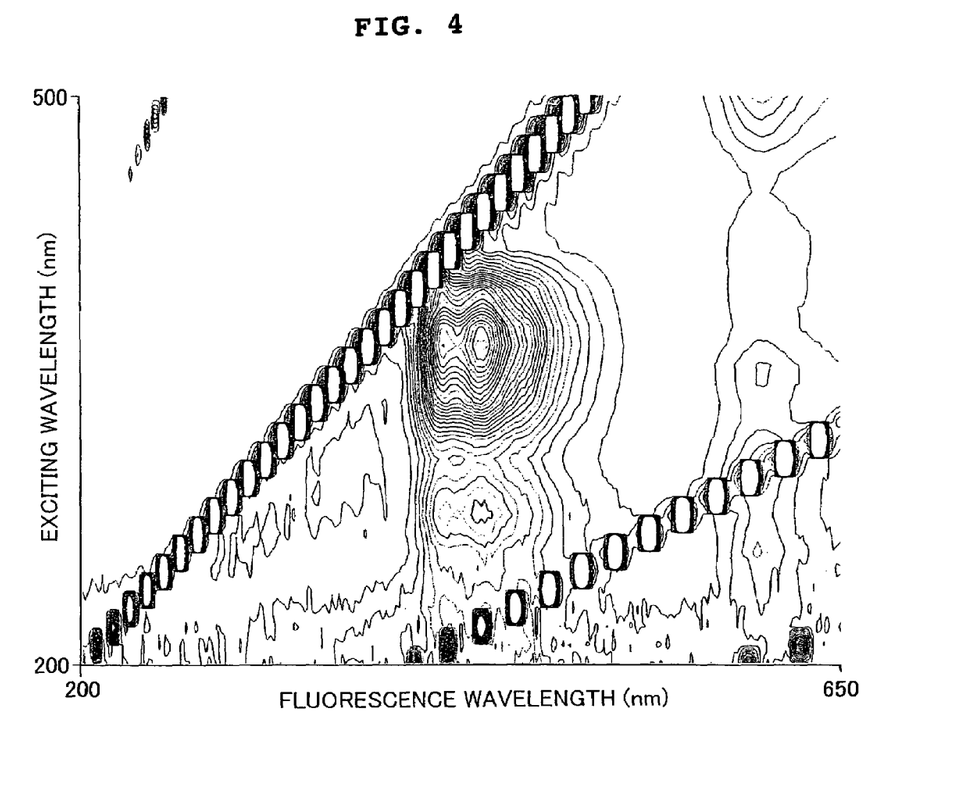
FIG. 4 shows a three-dimensional fluorescence spectrum of an ink containing only C.I. Basic Violet 11:1.
Figure 5:
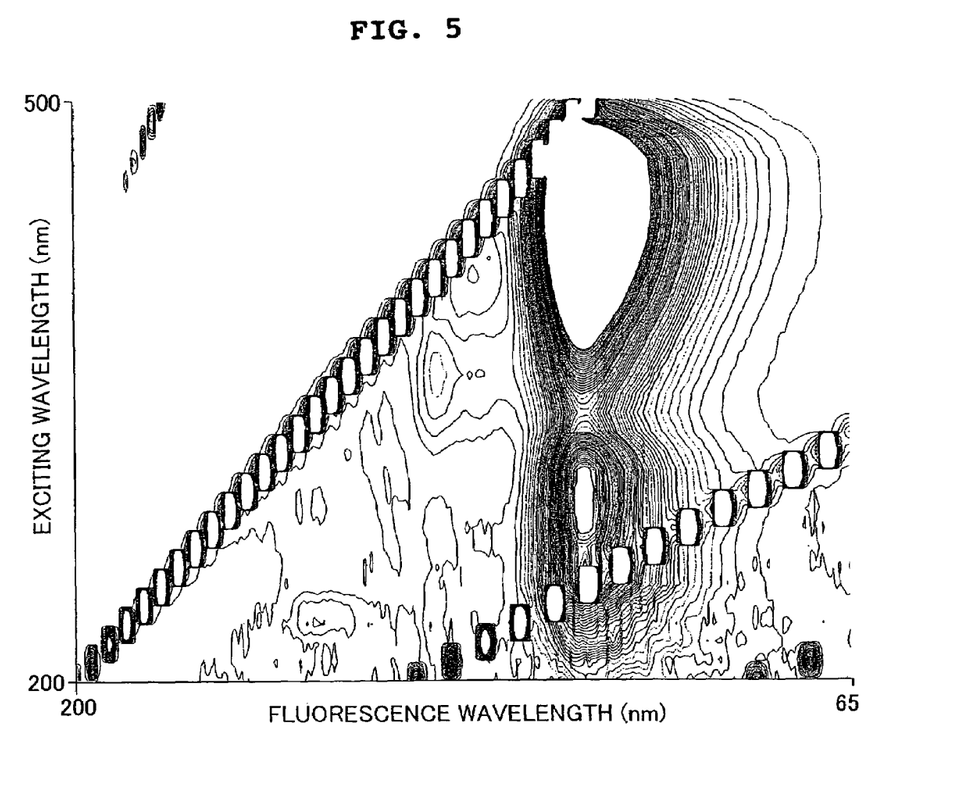
FIG. 5 shows a three-dimensional fluorescence spectrum of an ink containing only C.I. Basic Yellow 40.

FIG. 3 shows the three-dimensional fluorescence spectrum of the ink of Example 4 as an example of the three-dimensional fluorescence spectrum. In the three-dimensional fluorescence spectrum shown in FIG. 3, the vertical axis indicates the wavelength (nm) of the exciting light, and the horizontal axis indicates the fluorescence wavelength (nm), wherein the fluorescence intensity is indicated by contour lines. In the drawing, rectangular patterns in an array, in which both of the fluorescence and the exciting light are shifted toward the long wavelength side, result from the exciting light and the secondary light thereof. The ink of Example 4 contains C.I. Basic Violet 11:1 and C.I. Basic Yellow 40 in the ink. However, in order to investigate the influence of the fluorescent dyes on the fluorescence intensity, an ink containing only C.I. Basic Violet 11:1 and an ink containing only C.I. Basic Yellow 40 were prepared in the same manner as described above, with which the recording was performed under the same condition as that described above. After that, the three-dimensional fluorescence spectrums were measured therefor respectively. In the ink containing only C.I. Basic Violet 11:1, the % by weights of C.I. Basic Violet 11:1, glycerol, and butyltriglycol are the same as the % by weights of the respective components of the ink of Example 4. Further, in the ink containing only C.I. Basic Yellow 40, the % by weights of C.I. Basic Yellow 40, glycerol, and butyltriglycol are the same as the % by weights of the respective components of the ink of Example 4. FIGS. 4 and 5 show the three-dimensional fluorescence spectrums of the ink containing only C.I. Basic Violet 11:1 and the ink containing only C.I. Basic Yellow 40 respectively. When FIGS. 3, 4, and 5 are compared with one another, it is understand that the fluorescence band, which appears at 470 to 550 nm when only C.I. Basic Yellow 40 is contained as shown in FIG. 5, virtually disappears when both of C.I.

Basic Yellow 40 and C.I. Basic Violet 11:1 are contained, as appreciated from FIG. 3. Further, it is understand that the intensity of the fluorescence band which appears at 600 to 630 nm when only C.I. Basic Violet 11:1 is contained as shown in FIG. 4 appears more strongly when both of C.I. Basic Yellow 40 and C.I. Basic Violet 11:1 are contained, as appreciated from FIG. 3. Any one of the peaks which appear at 400 to 480 nm in FIGS. 3 to 5 is the fluorescence resulting from a fluorescent whitening agent contained in the test paper. This fact has been revealed from a result of the measurement of the fluorescence spectrum with the test paper singly.

Figure 6:
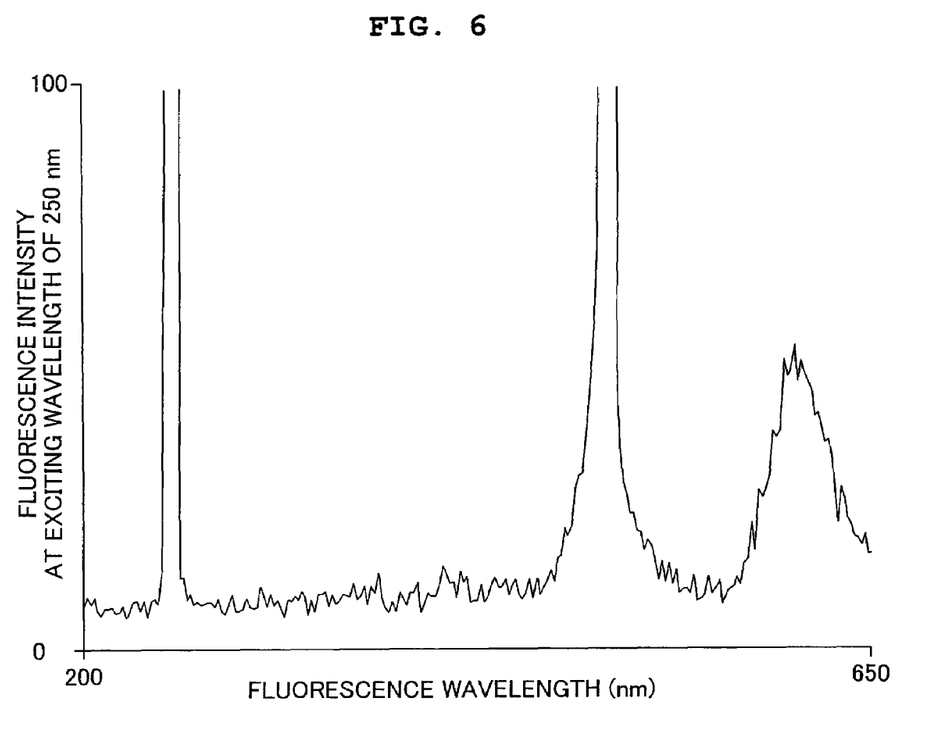
FIG. 6 shows a fluorescence spectrum of the ink of Example 4 at an exciting wavelength of 250 nm.
Figure 7:
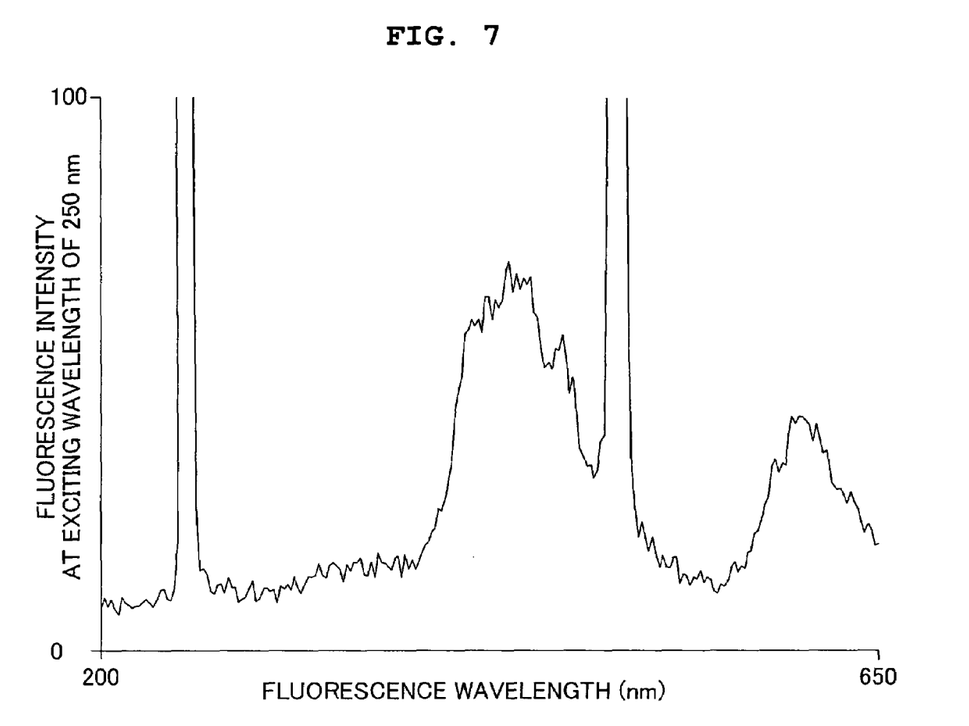
FIG. 7 shows a fluorescence spectrum of the ink containing only C.I. Basic Violet 11:1 at an exciting wavelength of 250 nm.
Figure 8:
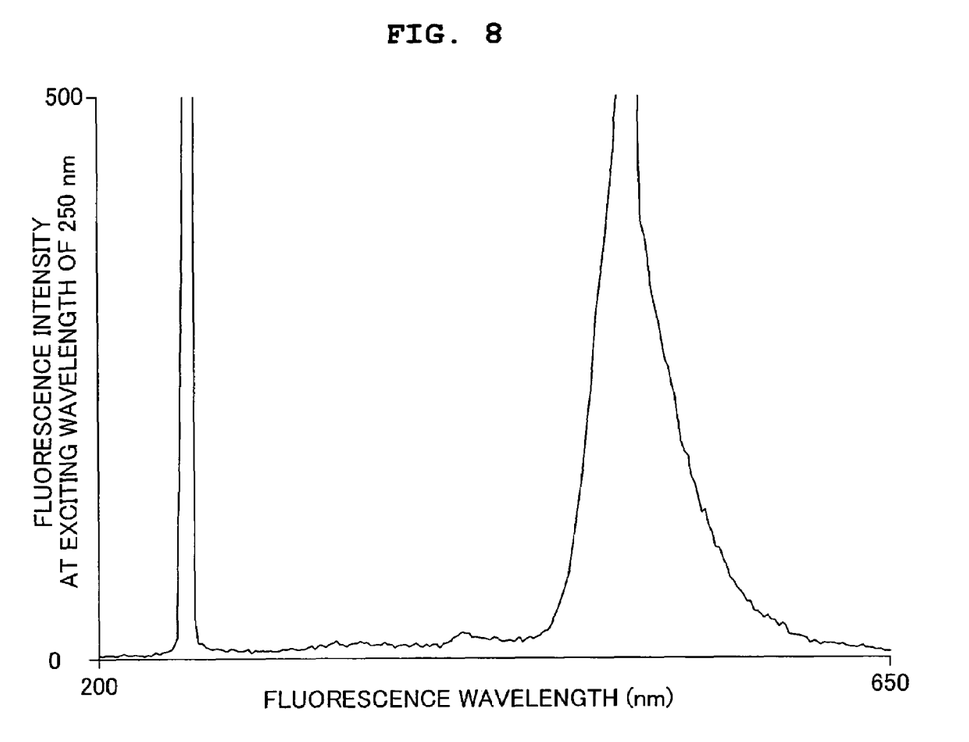
FIG. 8 shows a fluorescence spectrum of the ink containing only C.I. Basic Yellow 40 at an exciting wavelength of 250 nm.

In order to more comprehensively understand the results of FIGS. 3 to 5, the three-dimensional fluorescence spectrums in FIGS. 3 to 5 are sliced along the horizontal axis on condition that the wavelength of the exciting light source is fixed to 250 nm to provide two-dimensional fluorescence spectrums in FIGS. 6 to 8 each of which represents the fluorescence intensity (vertical axis) with respect to the fluorescence wavelength (horizontal axis) thereby. It is understood that the fluorescence band of 470 to 550 nm shown in FIG. 8, which is characteristic of C.I. Basic Yellow 40, virtually disappears in the fluorescence spectrum shown in FIG. 6 for the ink containing C.I. Basic Yellow 40 and C.I. Basic Violet 11:1. The intensity of the characteristic fluorescence band which appears at 600 to 630 nm in the fluorescence spectrum shown in FIG. 6 is increased as compared with the intensity of the fluorescence band at 600 to 630 nm obtained when only C.I. Basic Violet 11:1 is contained as shown in FIG. 7. According to the fact described above, it is considered that the fluorescence energy at 470 to 550 nm, which is emitted by C.I. Basic Yellow 40, is subjected to the energy transfer to C.I. Basic Violet 11:1 which has the absorption characteristic as shown in FIG. 2, and consequently the fluorescence intensity of C.I. Basic Violet 11:1 is successfully increased.

Evaluation

The peak intensity was obtained from the fluorescence spectrum measured as described above for each of the inks of Examples 1 to 4 and Comparative Examples 1 to 6. The fluorescence intensity was judged from the obtained peak intensity in accordance with the following criteria. The peak intensity is the peak intensity of the fluorescence obtained when the wavelength of the exciting light is 250 nm. In the following criteria, the fluorescence intensity of not less than 250 is the fluorescence intensity which is sufficient when the recognition is made visually with the naked eye. The fluorescence intensity of not less than 300 is the fluorescence intensity which is extremely excellent when the recognition is made visually with the naked eye.

++: the fluorescence intensity is not less than 300;
+: the fluorescence intensity is not less than 250 and less than 300;
±: the fluorescence intensity is not less than 200 and less than 250;
−: the fluorescence intensity is less than 200.

Results are shown in Table 3. As understood from Table 3, it is appreciated that the inks, which use the combinations of the fluorescent dyes according to the present invention, are excellent in the fluorescence intensity. In particular, it is understood that the fluorescence intensity is extremely increased when the fluorescent dyes of Examples 3 and 4 are used.

TABLE 3

| | Fluorescence intensity | Evaluation |
|---|---|---|
| Example 1 | 250 | + |
| Example 2 | 270 | + |
| Example 3 | 330 | ++ |
| Example 4 | 350 | ++ |
| Comparative Example 1 | 200 | ± |
| Comparative Example 2 | 240 | ± |
| Comparative Example 3 | 150 | − |
| Comparative Example 4 | 170 | − |
| Comparative Example 5 | 170 | − |
| Comparative Example 6 | 180 | − |

According to the present invention, the energy is transferred from the second fluorescent dye to the first fluorescent dye without any radiation, in place of the emission of the fluorescence by the second fluorescent dye. Therefore, the first fluorescent dye can further emit the fluorescence, and it is possible to enhance the fluorescence intensity of the ink.

What is claimed is:

1. A fluorescent water base ink for ink-jet recording comprising:
   water;
   a first fluorescent dye; and
   a second fluorescent dye, wherein:
   the first fluorescent dye is a color fluorescent dye which absorbs light in a first absorption wavelength region in an ultraviolet region to emit fluorescence and which absorbs light in a second absorption wavelength region to emit no fluorescence;
   the second fluorescent dye is a fluorescent dye which absorbs light in an absorption wavelength region in the ultraviolet region to emit fluorescence, the absorption wavelength region in the ultraviolet region being different from the first absorption wavelength region of the first fluorescent dye, a wavelength region of the fluorescence of the second fluorescent dye being not overlapped with the first absorption wavelength region of the first fluorescent dye, and at least a part of the wavelength region of the fluorescence of the second fluorescent dye being overlapped with the second absorption wavelength region; and
   the first fluorescent dye is selected from the group consisting of C.I. Basic Red 2, C.I. Basic Red 9, C.I. Basic Red 12, C.I. Basic Red 13, C.I. Basic Red 14, C.I. Basic Red 17, C.I. Basic Violet 1, C.I. Basic Violet 3, C.I. Basic Violet 7, C.I. Basic Violet 10, and C.I. Basic Violet 14.

2. The fluorescent water base ink for ink-jet recording according to claim 1, wherein a content of the first fluorescent dye is 0.1 to 2.0% by weight with respect to a total weight of the fluorescent water base ink for ink-jet recording.

3. The fluorescent water base ink for ink-jet recording according to claim 2, wherein the content of the first fluorescent dye is 0.3 to 1.0% by weight with respect to the total weight of the fluorescent water base ink for ink-jet recording.

4. The fluorescent water base ink for ink-jet recording according to claim 1, wherein the second fluorescent dye is one selected from the group consisting of C.I. Basic Yellow 9, C.I. Basic Yellow 11, C.I. Basic Yellow 21, C.I. Basic Yellow 35, C.I. Basic Yellow 37, C.I. Basic Yellow 40, C.I. Basic Yellow 44, and C.I. Basic Yellow 95, and a content of the second fluorescent dye is 0.1 to 5.0% by weight with respect to a total weight of the fluorescent water base ink for ink-jet recording.

5. The fluorescent water base ink for ink-jet recording according to claim 4, wherein the content of the second fluorescent dye is 0.3 to 3.0% by weight with respect to the total weight of the fluorescent water base ink for ink-jet recording.

6. The fluorescent water base ink for ink-jet recording according to claim 1, wherein the second fluorescent dye is C.I. Basic Yellow 37 or C.I. Basic Yellow 40.

7. The fluorescent water base ink for ink-jet recording according to claim 1, wherein the second absorption wavelength region of the first fluorescent dye exists in a visible region.

8. The fluorescent water base ink for ink-jet recording according to claim 1, wherein the first fluorescent dye receives, from the second fluorescent dye, energy which corresponds to light absorption in the second absorption wavelength region.

9. The fluorescent water base ink for ink-jet recording according to claim 1, wherein a peak intensity in a fluorescence wavelength region of the first fluorescent dye, which is obtained when a fluorescence spectrum is measured for the fluorescent water base ink containing the first fluorescent dye at a predetermined concentration, is higher than a peak intensity in the fluorescence wavelength region of the first fluorescent dye which is obtained when a fluorescence spectrum is measured for a fluorescent water base ink not containing the second fluorescent dye and containing the first fluorescent dye at the predetermined concentration singly.

10. The fluorescent water base ink for ink-jet recording according to claim 1, wherein a peak intensity in the second fluorescence wavelength region, which is obtained when a fluorescence spectrum is measured for the fluorescent water base ink containing the second fluorescent dye at a predetermined concentration, is lower than a peak intensity in the second fluorescence wavelength region which is obtained when a fluorescence spectrum is measured for a fluorescent water base ink not containing the first fluorescent dye and containing the second fluorescent dye at the predetermined concentration singly.

11. A fluorescent water base ink for ink-jet recording consisting essentially of:
water;
a first fluorescent dye; and
a second fluorescent dye, wherein:
the first fluorescent dye is a color fluorescent dye which absorbs light in a first absorption wavelength region in an ultraviolet region to emit fluorescence and which absorbs light in a second absorption wavelength region to emit no fluorescence;
the second fluorescent dye is a fluorescent dye which absorbs light in an absorption wavelength region in the ultraviolet region to emit fluorescence, the absorption wavelength region in the ultraviolet region being different from the first absorption wavelength region of the first fluorescent dye, a wavelength region of the fluorescence of the second fluorescent dye being not overlapped with the first absorption wavelength region of the first fluorescent dye, and at least a part of the wavelength region of the fluorescence of the second fluorescent dye being overlapped with the second absorption wavelength region.

12. The fluorescent water base ink for ink-jet recording according to claim 11, further including at least one of moistening agents, permeating agents, surfactants, viscosity-adjusting agents, surface tension-adjusting agents, pH-adjusting agents and antiseptic/fungicidal agents.

* * * * *